United States Patent
Sander

(10) Patent No.: US 6,883,952 B2
(45) Date of Patent: Apr. 26, 2005

(54) APPARATUS FOR ILLUMINATING A VIEWING FIELD BY TWO LIGHT SOURCES

(75) Inventor: Ulrich Sander, Rebstein (CH)

(73) Assignee: Leica Microsystems AG, Heerbrugg (CH)

( * ) Notice: Subject to any disclaimer, the term of this patent is extended or adjusted under 35 U.S.C. 154(b) by 151 days.

(21) Appl. No.: 10/146,125

(22) Filed: May 16, 2002

(65) Prior Publication Data

US 2003/0007365 A1 Jan. 9, 2003

(30) Foreign Application Priority Data

May 16, 2001 (DE) .......................................... 101 23 785

(51) Int. Cl.[7] .............................................. G02B 21/00
(52) U.S. Cl. ........................ 362/575; 362/554; 362/231
(58) Field of Search ................. 362/554, 575, 362/293, 277, 319, 322, 231; 359/385, 389

(56) References Cited

U.S. PATENT DOCUMENTS

| 3,825,336 | A | * | 7/1974 | Reynolds ........................ 355/1 |
| 4,048,486 | A | * | 9/1977 | Kriege ........................ 362/554 |
| 4,158,310 | A | * | 6/1979 | Ho ................................ 73/705 |
| 5,051,578 | A | * | 9/1991 | Slemon et al. ......... 250/227.23 |
| 6,513,937 | B1 | * | 2/2003 | Dehmlow ..................... 353/94 |

FOREIGN PATENT DOCUMENTS

| DE | 100 20 279 A1 | 1/2001 |
| JP | 61-209414 A | 9/1986 |
| JP | 8-68942 A | 3/1996 |
| JP | 2000-98246 A | 4/2000 |

* cited by examiner

Primary Examiner—Thomas M. Sember
(74) Attorney, Agent, or Firm—Foley & Lardner LLP

(57) ABSTRACT

The invention concerns an apparatus for illuminating a viewing field by means of two light sources. The beam paths of the two light sources are guided through a combining flexible light guide, a common flexible light guide, and a separating flexible light guide splitter. One of the two beam paths is directed to the microscope as principal illumination, and the other beam is directed to a handpiece. In addition, at least one of the two light sources can be configured as an interchangeable unit having two individual light sources.

26 Claims, 6 Drawing Sheets

APPARATUS FOR ILLUMINATING A VIEWING FIELD BY TWO LIGHT SOURCES

CROSS REFERENCE TO RELATED APPLICATIONS

This application claims priority to German Patent Application 101 23 785.5 filed May 16, 2001, which is incorporated herein by reference.

BACKGROUND OF THE INVENTION

1. Field of the Invention

The invention concerns an apparatus for illuminating a viewing field, for example a specimen field under a microscope, by means of two light sources.

2. Description of the Related Art

Illumination of a specimen field using two light sources is being increasingly utilized in a variety of applications. The reason for the increased usage is the ability to illuminate the specimen with different light wave spectra, for example UV and/or white light, and/or from different directions. This is applicable in particular to dental medicine, in which light of specific wavelengths is used to polymerize plastics.

The use of flexible light guides (also referred to as optical fiber bundles) makes it possible to deliver light in relatively collimated fashion while focusing the majority of the light onto those locations that are to be illuminated. Further, this is possible while positioning heat-generating lamps remotely from the specimen to be illuminated. A common example of such an flexible light guide is called a "multi-arm cable light guide."

Spectral filters exclude damaging or undesired light wavelengths. In a variety of known illumination apparatuses, such filters may be replaceably mounted or provided on a carrier so that the filter can be pivoted or slid, as necessary, in front of the flexible light guide or in front of the lamp.

Illumination changers (also referred to as "changing apparatuses") having interchangeable lamps allow a burned-out lamp to be replaced with a spare lamp, so as to minimize the interruption time in the event of a lamp failure. Leica Microsystems' M500™, used in the field of surgical microscopy, includes a microscope and an illumination apparatus mounted on a stand; an flexible light guide extends between the illumination apparatus and the microscope. A single filter, which filters out damaging light wavelengths, is provided between the lamp and the flexible light guide. Two interchangeable lamps are located on a pivotable carrier that can be pivoted from outside by means of a rotary handle. It is possible to switch from one lamp to the other by pivoting the lamp away from the flexible light guide and pivoting the other lamp in front of it. The filter itself is movable and can readily be replaced with other filters.

Interchangeable filter mounts already exist in the context of illumination apparatuses. A known assemblage (OPMI® VISU 2000 of the Carl Zeiss company in Oberkochen) comprises an interchangeable lamp mount on a pivotable base and an interchangeable filter mount that comprises a rotatable disk having orifices in which the interchangeable filters are inserted. The disk is rotatable about a shaft on the housing, in a plane perpendicular to the flexible light guide, so that by rotation of the disk, different filters can alternately be placed in front of the flexible light guide. The rotation is brought about by a linkage that passes beneath the pivotable interchangeable lamp mount and is joined to a rotary knob outside the housing. The base of the interchangeable lamp mount is pivotable in a plane perpendicular to the disk having the interchangeable filters. Thus, there are completely separate assemblages for both the interchangeable lamp mount and for the interchangeable filter mount. Moreover, the two interchangeable lamp mounts have operating elements and linkages that are mutually independent.

The known systems are disadvantageous in many respects. First, apparatuses of this kind generally require two separate illumination systems which are switched and manipulated independently of one another. Second, as the handpiece of the second light source is independent of the microscope, it must be brought manually to the point requiring polymerization. This results in complex manual manipulation of the second light source and, as a rule, necessitates an assistant (if the physician wishes to perform other actions). Third, the independent switchability of the individual light sources increases the operating complexity of the individual light sources. Fourth, easy changing between the two illumination systems is not possible. As a result, for example, with the one illumination system only UV light is available, making precise positioning difficult or impossible because UV light is invisible. And, fifth, illumination apparatuses having interchangeable filters contain a complex linkage for the interchangeable filter mount yielding an undesirably large overall volume for the assemblage.

SUMMARY OF THE INVENTION

A first aspect of the invention an addresses an apparatus for illuminating a viewing field which includes a first light source adapted to emit a first beam of light along a first beam path and a second light source adapted to emit a second beam of light along a second beam path. A combining flexible light guide is provided and is adapted to collimate the first and second beams into a unified beam which is guided by a common flexible light guide to a separating flexible light guide splitter which is adapted to divide the unified beam into at least two beams. A first of the at least two beams is directed to a light output of a microscope and a second of the at least two beams is directed to a handpiece which may be fixedly attached to the microscope via a mount such as by a flexible gooseneck In the aforementioned apparatus, the two light sources may be adapted to emit different wave spectra and/or are interchangeably arranged. Similarly, at least one of the light sources may be interchangeably arranged. Further, each of the light sources may be interchangeably exchanged independently of the other light source. Each of the first and second beam paths preferably follows an flexible light guide to the combining flexible light guide. In addition, at least one of the light sources may be: (a) constantly (during the life of the light source) usable and/or exchangeable in an electronically controlled fashion thereby accounting for changes in light intensity and/or wavelength spectra during the life of the light source; or (b) usable in continuous or pulsed fashion.

In the aforementioned apparatus, the common flexible light guide may be a double flexible light guide comprising dual light guides. Further, each of the dual light guides may be adapted to transport at least a portion of the unified beam. In this apparatus, the first and second beam paths are preferably conveyed via a Fresnel lens system and the combining flexible light guide to the dual light guides of the common flexible light guide.

The apparatus may also include spectral filters positioned in the first and second beam paths between the light sources and the combining flexible light guide. In this apparatus, at least one of the light sources, the spectral filters, and the common flexible light guide is preferably adapted to be shifted. Further, the spectral filters are preferably exchangeable and such exchanging of the spectral filters can be driven manually and/or electromechanically. It is also possibly to control the exchanging of the spectral filters by an illumination computer that is parameter-controlled.

In the aforementioned apparatus, one or both of the light sources may configured as an interchangeable unit having two light source components. Further, the two light source components may be arranged coaxially and rotatably. In addition, an entrance of the common flexible light guide may be rotatable on a holding plate that is pivotable about a shaft.

In the aforementioned invention, a plurality of interchangeable filters may be arranged coaxially and rotatably on a holding plate that is pivotable about a shaft. Further, any of the plurality of interchangeable filters may be adapted to be in front of either the first or second light sources. Further, the holding plate may be controllable manually via a rotary knob and/or electromechanically. In addition, an entrance of the common flexible light guide may be rotatable on a second holding plate that is pivotable about the shaft. Further, the holding plates may be controllable manually via a rotary knob and/or electromechanically. However, alternatively, the rotation of either or both of the holding plates about the shaft may be controlled by a computer.

These and other features, aspects, and advantages of the present invention will become more apparent from the following description, appended claims, and accompanying exemplary embodiments shown in the drawings.

BRIEF DESCRIPTION OF THE DRAWINGS

The accompanying drawings, which are incorporated in and constitute a part of the specification, illustrate various embodiments of the invention and together with the description, serve to explain the principles of the invention.

DETAILED DESCRIPTION OF PREFERRED EMBODIMENTS

Figure 1:
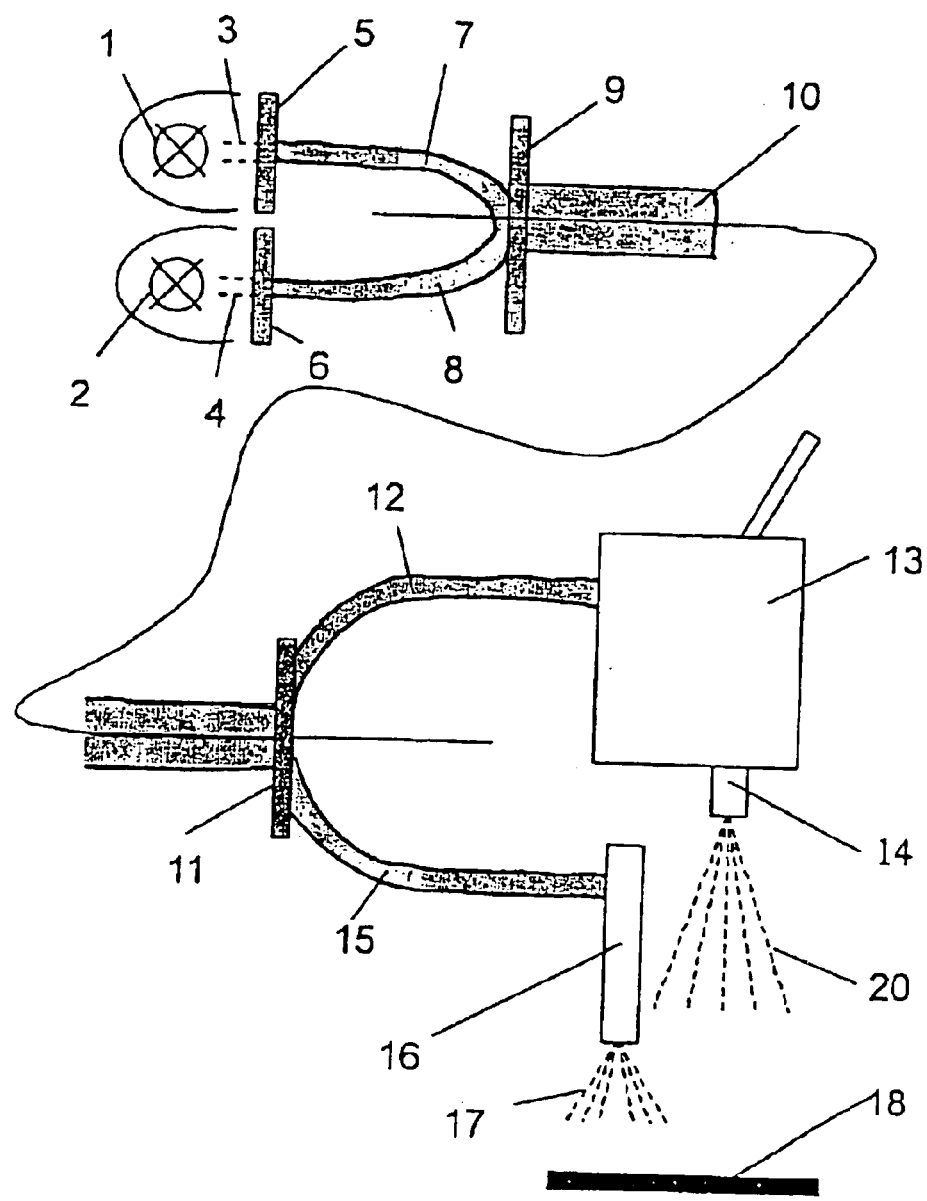
FIG. 1 is a symbolic overall configuration of an optical illumination device having two different light sources, for example for a surgical microscope.

In particular, for purposes of the invention "concentric" is also to be understood as "parallel," and "pivot" also as "slide." The explanation for this is that for this invention, a straight line is understood as a curve having an infinite radius. In each of the exemplary embodiments, two interchangeable lamps and a plurality of interchangeable filters are depicted. The invention is not, however, limited to a specific number of lamps or filters.

The invention addresses an apparatus which allows for the illumination of a specimen field by means of two separate light sources that are jointly controlled and/or manipulated thereby eliminating, or at least reducing, the aforementioned disadvantages. This is achieved by combining the beam paths of the two light sources, via a combining flexible light guide, onto a common flexible light guide. This common flexible light guide directs the beam paths to a separating flexible light guide splitter which divides the two illumination beam paths and conveys them separately to a microscope as principal illumination, and to a handpiece.

This apparatus is usable irrespective of whether any one or more of the following is true: (a) the light extends over different wavelength regions; (b) the light is in pulsed or time-limited fashion; (c) the light is guided to the combining flexible light guide via flexible light guides, via a Fresnel lens system, or other optics; (d) spectral filters are interposed between the light sources and the flexible light guide; and (e) the light sources are arranged interchangeably or replaceably, for example to make possible UV illumination through the microscope objective, or the white light as a second illumination type through the handpiece.

The preferred embodiment of the invention is configured as an illumination changer that has the following properties: (a) the apparatus is integrated and as small as possible; (b) the operating elements for actuation of the interchangeable lamp mounts and the interchangeable filter mount are readily reachable by the user; and (c) in the interest of greater robustness, the operating elements are joined as directly as possible (i.e., eliminating linkages and the like) to the parts of the changing apparatuses that are to be moved. This is achieved by a changing apparatus (illumination changer) that in a first variant includes: (a) at least one light source embodied as an interchangeable unit having two concentrically rotatable individual light sources; and (b) interchangeable filters rotatably arranged concentrically with the light sources. In this changing apparatus, the operating elements engage, preferably via shafts, directly onto respective mounts so that: (i) linkages or the like are omitted; (ii) robustness is high; and (iii) the assemblage is optimally integrated.

This changing apparatus (i.e., illumination changer) can be embodied in several further embodiments. A second embodiment also provides for two concentric interchangeable mounts. However, in contrast to the first embodiment, an interchangeable lamp mount is not provided. Rather, the lamps are mounted immovably. The input of the flexible light guide, however, is mounted on a pivotable changeable holder. This configuration eliminates movement of the lamps while simultaneously allowing rapid changing. A third embodiment, according to the present invention, replaces both the pivotability of the lamps and the pivotability of the flexible light guide. Instead of the pivotability of the flexible light guide, an optical component is pivotably arranged. This pivoting results in a switchover of the light path from the one immovable lamp to the flexible light guide to the other immovable lamp to the flexible light guide. A fourth variant is an alternative to the third. In this case, the optical components are not pivotably arranged but rather are linearly displaceable.

The present invention for illuminating a viewing field by means of two light sources each having a beam path results in a number of improvements. First, it is possible to construct a common integrated illumination system whose light sources are controlled and switched individually and/or together. Second, the two types of illumination of the specimen field can be integrated into one common assemblage, for example in the stand of a microscope, thereby simplifying practical handling. Third, the use of a common flexible light guide as a conduit from the light sources to the microscope or handpiece makes possible a compactly configured and especially lightweight instrument resulting in less stress on the stand assemblage. Fourth, different light sources or light wavelengths can be used, consistent with the differing purposes of the two light sources. Fifth, the handpiece can be attached to the microscope, for example by means of a gooseneck. Sixth, the light sources are, if necessary, differently controllable, for example in pulsed or time-limited fashion. Seventh, filters can be inserted, if necessary, between the light sources and the combining flexible light guide. And, eighth, the two main light sources may be replaceably arranged, so that it is possible to associate one of the two light sources selectably with the microscope or handpiece, thus simplifying accurate positioning of the handpiece in particular.

The particular development of the invention, or the use of an illumination changer according to the present invention, in the context of at least one of the two light sources results in various additional improvements including: (i) very rapid lamp changing which may be particularly useful, for example, in the event of failure of a lamp; (ii) a filter system having different spectral filters can be integrated into a small space; (iii) the elimination of linkages and the like yields great robustness and low displacement resistance; (iv) the assemblage as a whole is better integrated; and (v) variants having immovably arranged lamps reduce mechanical stresses on the lamps (due to shocks) while retaining interchangeability, thereby increasing their service life.

Reference will now be made in detail to presently preferred embodiments of the invention, which are illustrated in the drawings. The same reference numbers throughout the drawings to refer the same or like parts.

Figure 3:
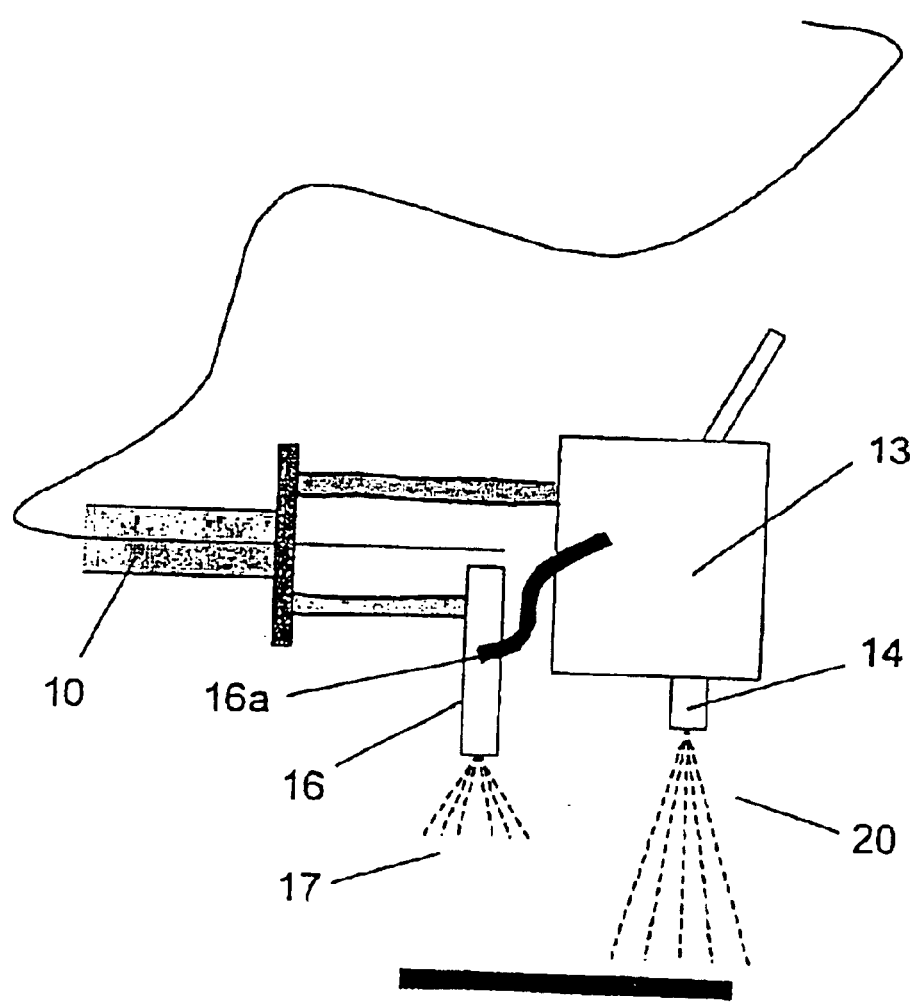
FIG. 3 depicts the attachment of the handpiece to the microscope by means of, for example, a gooseneck.

FIG. 1 symbolically shows the overall configuration of an optical illumination device, according to the present invention, having two light sources 1, 2 each defining a beam path 3, 4, respectively. Interchangeable filters 5, 6 are preferably introduced at or near the beginning of their beam paths 3, 4. The two beams are generated in the light sources 1, 2 are directed by flexible light guides 7, 8 to a combining flexible light guide 9. The combining flexible light guide 9 collimates the light beams 3, 4; the combined beams are directed to, and pass through, a common flexible light guide 10. Subsequently, a separating flexible light guide splitter 11 separates the light waves. Part of the light separated by the separating splitter 11 is directed, via an flexible light guide 12, to an objective 14 of the main illumination system of a microscope 13 at which it is outputted along an objective beam path 20 to a specimen 18. Another flexible light guide 15 directs the remainder of the light passing through the separating splitter 11 to a handpiece 16 which may be attached to the microscope 13 by a connector such as a gooseneck 16a (as shown in FIG. 3). As a result of the light passing through the handpiece 16, it is possible to direct a second beam path 17 to the specimen 18.

Figure 2:
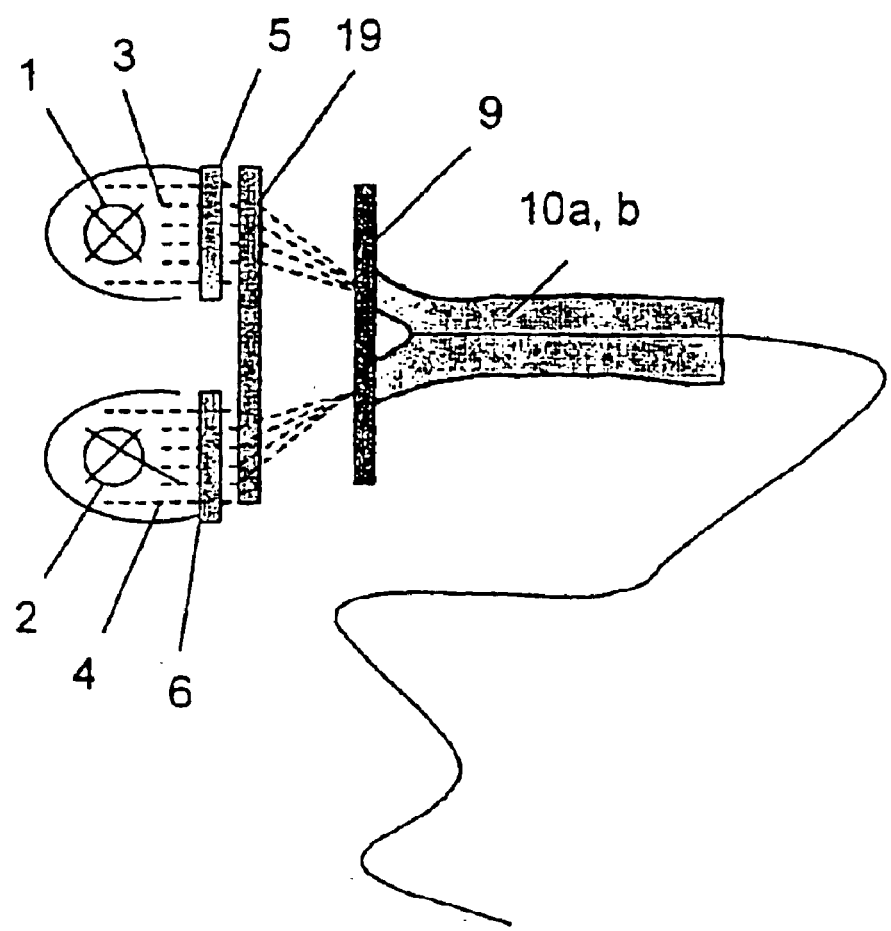
FIG. 2 is a symbolic configuration of a system of two light sources which are imaged, via a Fresnel lens system, onto a combining flexible light guide.

Although flexible light guide 10 is preferably configured as a single-channel flexible light guide, it could be configured as a dual flexible light guide, as shown in FIG. 2. Similar to the embodiment shown in FIG. 1, FIG. 2 schematically shows two light sources 1, 2 which emit light along respective beam paths 3, 4 having interchangeable filters 5, 6 introduced therein. However, the embodiment shown in FIG. 2 also includes a Fresnel lens system 19 and a dual flexible light guide. The double flexible light guide is capable of directing light of different wavelengths along dual light guides 10a, 10b provided therein. In addition, the two light sources 1, 2 may be shiftably or interchangeably arranged and/or can be used in a pulsed or time-limited fashion.

Figure 4:
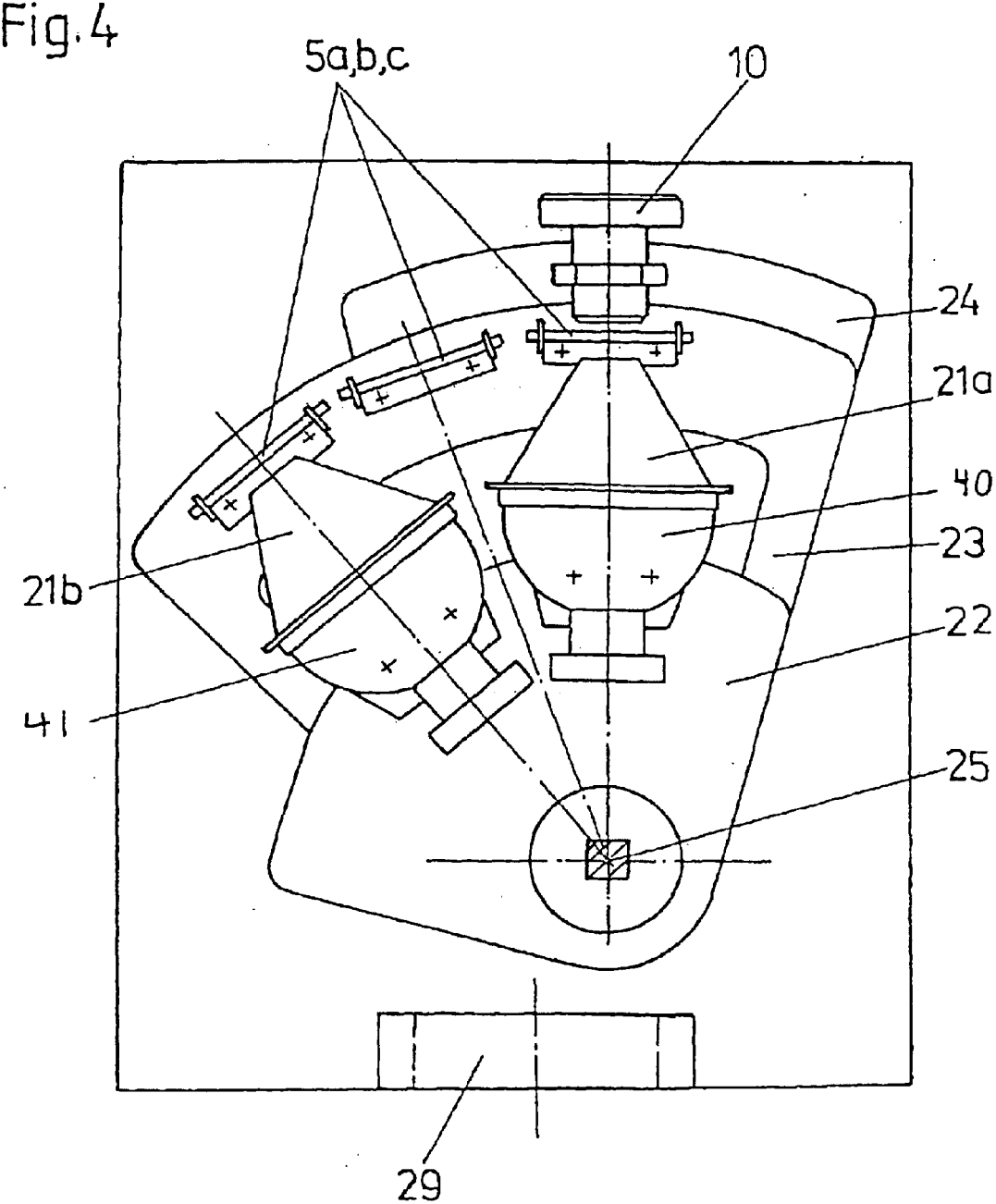
FIG. 4 is a schematic depiction of the physical configuration of an illumination changer.
Figure 5:
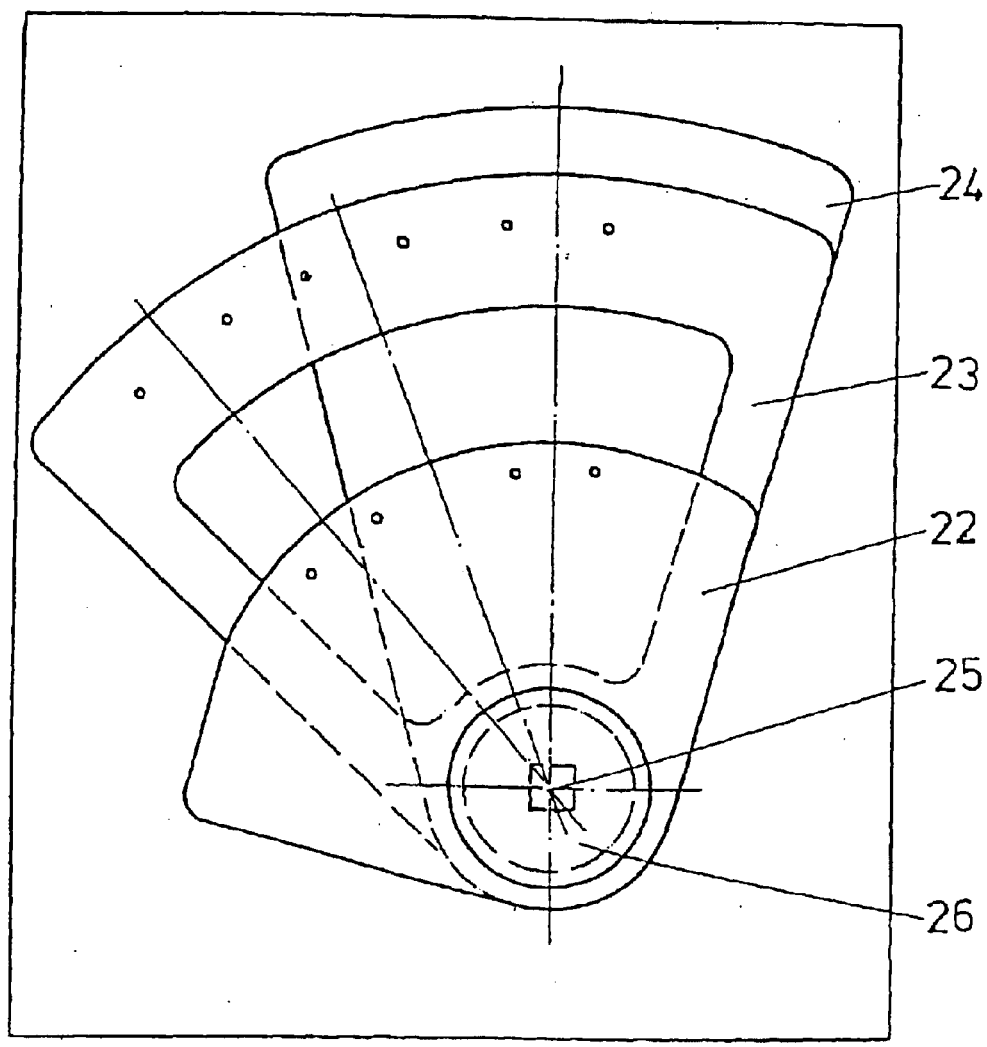
FIG. 5 is a schematic depiction of the pivotable retaining plate of the illumination changer depicted in FIG. 4.

FIGS. 4 and 5 schematically show the configuration of an illumination changer having two light sources 40, 41 and an optical system 21a, 21b for light sources 40 and 41, respectively. Light source 1 and filter 5 (in FIG. 1) may be replaced with interchangeable light sources 40, 41 and interchangeable filters 5a, 5b, 5c (in FIG. 4). Similarly, light source 2 and filter 6 (in FIG. 1) may be replaced with the FIG. 4 arrangement. An upstream filter system 5a, 5b, 5c for the light sources 40, 41 is connected to a holding plate 23 rotatable about a shaft 25. The light sources may be attached to a second holding plate 22 and coaxially rotatable about the shaft 25. In addition, an flexible light guide 10 may be provided on a third holding plate 24 which is coaxially rotatable about the shaft 25. FIG. 5 depicts a rotary knob 26 for controlling the rotation of holding plates 22, 23, 24 about the shaft 25. The rotary knob 26 can be raised or lowered so that it can be selectably brought into engagement with one of plates 22, 23, or 24, thereby acting as a multifunctional operating knob. It should be understood that (a) the two interchangeable light sources 40, 41 replace only one of the light sources in FIG. 1; and (b) the three interchangeable filters 5a, 5b, 5c replace only one of the filters of FIG. 1.

Figure 6:
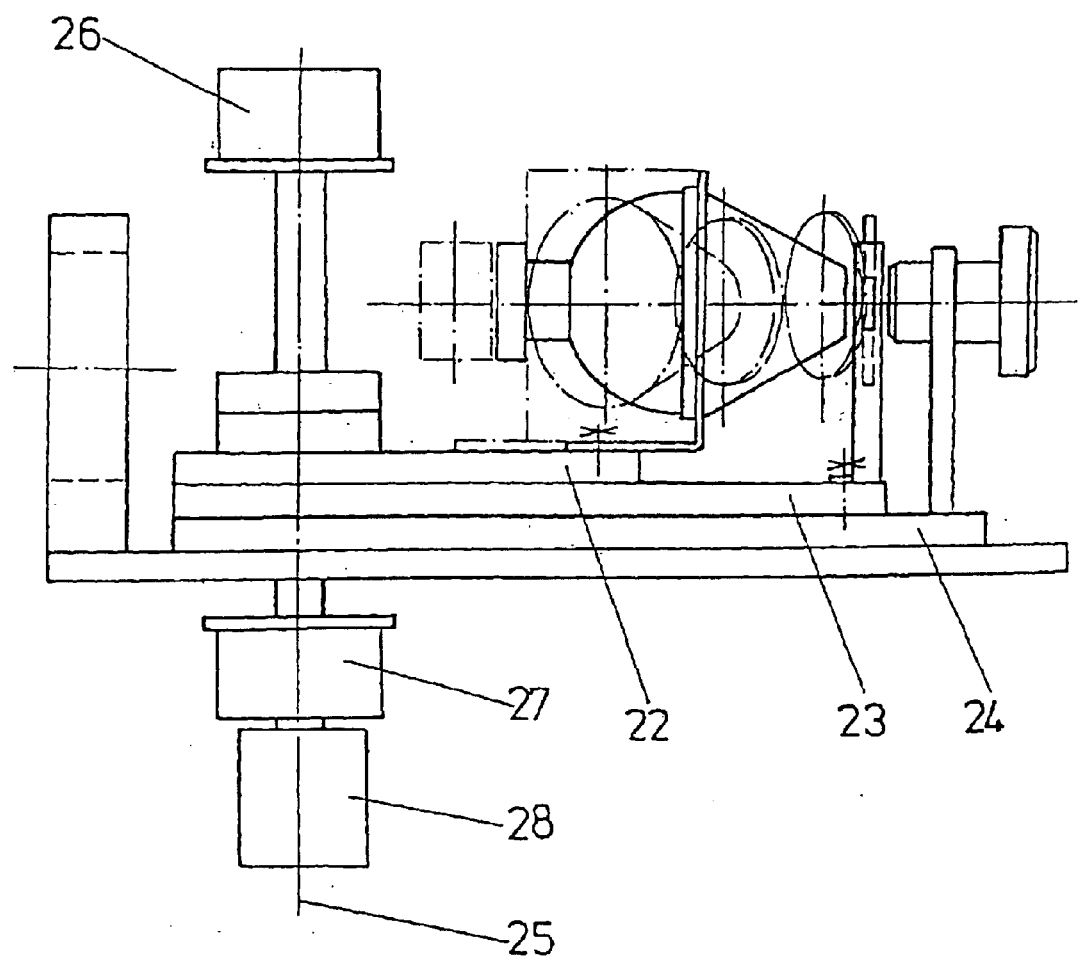
FIG. 6 is a side view of the illumination changer depicted in FIG. 4.

FIG. 6 depicts an illumination changer similar to that of FIGS. 4 and 5. However, this embodiment of the illumination changer has additional coaxially mounted rotary knobs 27 and 28 for separately controlling holding plates 23, 24 of filter system 5a, 5b, 5c and flexible light guide 10, respectively, i.e., in this embodiment, rotary knobs 26, 27, and 28 are not multifunctional. Rather, the rotary knob 26 rotates the lamps 40, 41 on plate 22, while rotary knob 27 rotates the filters 5a, 5b, 5c on plate 23, and rotary knob 28 rotates the flexible light guide 10 on plate 24.

Although the aforementioned describes preferred embodiments of the invention, the invention is not so restricted. On the contrary, it is also available to other users of optical devices having two different types of illumination of the specimen field (e.g., video and photographic cameras, distance measurement and focusing devices, etc.). It will be apparent to those skilled in the art that various modifications and variations can be made to the disclosed preferred embodiments of the present invention without departing from the scope or spirit of the invention. Accordingly, it should be understood that the apparatus and method described herein are illustrative only and are not limiting upon the scope of the invention, which is indicated by the following claims and equivalents thereof.

What is claimed is:

1. An apparatus for illuminating a viewing field comprising:
   a microscope having a light output;
   a handpiece;
   a first light source adapted to emit a first beam of light along a first beam path;
   a second light source adapted to emit a second beam of light along a second beam path;
   a combining flexible light guide which is adapted to collimate the first and second beams into a unified beam;
   a common flexible light guide adapted to guide the unified beam; and
   a separating flexible light guide splitter which is adapted to receive and divide the unified beam into at least two beams a first of which is directed to the light output of the microscope and a second of which is directed to the handpiece.

2. The apparatus as defined in claim 1, wherein the two light sources are adapted to emit different wave spectra.

3. The apparatus as defined in claim 1, wherein each of the first and second beam paths follows a flexible light guide to the combining flexible light guide.

4. The apparatus as defined in claim 1, wherein the two light sources are interchangeably arranged.

5. The apparatus as defined in claim 1, wherein each of the light sources is adapted to be interchangeably exchanged independently of the other light source.

6. The apparatus as defined in claim 1, wherein at least one of the light sources is constantly usable in an electronically controlled fashion.

7. The apparatus as defined in claim 1, wherein at least one of the light sources is usable in continuous or pulsed fashion.

8. The apparatus as defined in claim 1, wherein at least one of the light sources is interchangeably arranged.

9. The apparatus as defined in claim 1, wherein the handpiece is fixedly attached to the microscope via a mount.

10. The apparatus as defined in claim 1, wherein the handpiece is connected to the microscope by a flexible gooseneck.

11. The apparatus as defined in claim 1, wherein the common flexible light guide is a dual flexible light guide comprising dual light guides, and wherein each of the dual light guides is adapted to transport at least a portion of the unified beam.

12. The apparatus as defined in claim 11, wherein the first and second beam paths are conveyed via a Fresnel lens system and the combining flexible light guide to the dual light guides of the common flexible light guide.

13. The apparatus as defined in claim 1, further comprising:
spectral filters positioned in the first and second beam paths between the light sources and the combining flexible light guide.

14. The apparatus as defined in claim 13, wherein at least one of the light sources, the spectral filters, and the common flexible light guide is adapted to be shifted.

15. The apparatus as defined in claim 13, wherein the spectral filters are exchangeable.

16. The apparatus as defined in claim 15, wherein exchanging of the spectral filters can be driven manually and electromechanically.

17. The apparatus as defined in claim 15, wherein exchanging of the spectral filters is driven manually or electromechanically.

18. The apparatus as defined in claim 17, wherein the exchanging of the spectral filters is controlled by an illumination computer that is parameter-controlled.

19. The apparatus as defined in claim 1, wherein one or both of the light sources is configured as an interchangeable unit having two light source components.

20. The apparatus as defined in claim 19, wherein the two light source components are arranged coaxially and rotatably.

21. The apparatus as defined in claim 1, wherein an entrance of the common flexible light guide is rotatable on a holding plate that is pivotable about a shaft.

22. The apparatus as defined in claim 1, wherein a plurality of interchangeable filters are arranged coaxially and rotatably on a holding plate that is pivotable about a shaft, and wherein any of the plurality of interchangeable filters is adapted to be in front of either the first or second light sources.

23. The apparatus as defined in claim 22, wherein the holding plate is controllable manually via a rotary knob and/or electromechanically.

24. The apparatus as defined in claim 22, wherein an entrance of the common flexible light guide is rotatable on a second holding plate that is pivotable about the shaft.

25. The apparatus as defined in claim 24, wherein the holding plates are controllable manually via a rotary knob and/or electromechanically.

26. The apparatus as defined in claim 24, wherein the rotation of either or both of the holding plates about the shaft is controlled by a computer.

* * * * *